United States Patent [19]
Tomita et al.

[11] Patent Number: 5,617,733
[45] Date of Patent: Apr. 8, 1997

[54] ABSORBING TYPE WATER COOLING-HEATING APPARATUS

[75] Inventors: Syuji Tomita, Toride; Ryouhei Minowa, Ushiku, both of Japan

[73] Assignee: Hitachi, Ltd., Tokyo, Japan

[21] Appl. No.: 531,202

[22] Filed: Sep. 19, 1995

[30] Foreign Application Priority Data

Sep. 20, 1994 [JP] Japan .................................. 6-224774

[51] Int. Cl.$^6$ ............................ F25B 13/00; F25B 15/00
[52] U.S. Cl. .......................... 62/324.2; 62/141; 62/483
[58] Field of Search .................................. 62/141, 324.2, 62/487, 476, 101, 483

[56] References Cited

U.S. PATENT DOCUMENTS

| | | | |
|---|---|---|---|
| 2,785,540 | 3/1957 | Biehn | 62/324.2 |
| 3,145,542 | 8/1964 | Aronson | 62/476 |
| 4,437,321 | 3/1984 | Asai | 62/324.2 |
| 5,282,369 | 2/1994 | Ohuchi et al. | 62/324.2 |
| 5,363,668 | 11/1994 | Nakao et al. | 62/141 |

*Primary Examiner*—William Doerrler
*Attorney, Agent, or Firm*—Antonelli, Terry, Stout & Kraus, LLP

[57] ABSTRACT

The invention provides an absorbing type water cooling-heating apparatus which employs an electrically-operated valve and an improved method of diluting a solution for automatically changing between heating operation and cooling operation only by operating a cooling-heating changeover switch. The apparatus comprises an evaporator for evaporating a cooling medium to cool cooling water, an absorber for causing a solution to absorb steam of the cooling medium evaporated in the evaporator to dilute the solution, a high-temperature regenerator and a low-temperature regenerator for concentrating the dilute solution, fed thereto from the absorber, by forming steam of the cooling medium, a condenser for condensing the steam of the cooling medium, produced in the low-temperature regenerator, into a liquid, a solution circulating pump for circulating the solution, a cooling medium spray pump for spraying the cooling medium, a cooling medium steam pipe connecting the interior of the high-temperature regenerator, in which the cooling medium steam is contained, to the interior of the evaporator in which the cooling medium is sprayed, a throttle device provided in the cooling medium steam pipe, an electrically-operated valve provided in the cooling medium steam pipe, and a cooling-heating changeover switch connected to the electrically-operated valve for switching the electrically-operated valve when changing the operation of the apparatus between a cooling mode and a heating mode.

3 Claims, 3 Drawing Sheets

ABSORBING TYPE WATER COOLING-HEATING APPARATUS

BACKGROUND OF INVENTION

The present invention relates to an absorbing type water cooling-heating apparatus for supplying cold and hot water for cooling and heating purposes and other purposes.

Heretofore, to supply hot water from a water cooling-heating apparatus of this type, there are the following methods (a) to (c):

(a) A U-shaped seal pipe is provided to connect between a high-temperature regenerator and an evaporator, and steam of a cooling medium to be condensed at a condenser during a cooling operation is condensed at the evaporator during a heating operation, utilizing a pressure differential-maintaining function by a cooling medium liquid column, thereby supplying cold/hot water from a group of pipes of the evaporator.

(b) A steam pipe of a regenerator is branched off to introduce steam into a separately provided hot water-supplying heat exchanger, and hot water is supplied therefrom (see Japanese Patent Unexamined Publication No. 49-78251).

(c) The temperature of a solution in a regenerator is made very low during a heating operation, thereby suppressing the rise of a boiling point, and cooling medium steam produced in the regenerator is introduced into a condenser either directly or after condensation and re-evaporation of the steam in a low-temperature regenerator. The thus introduced steam effects heat exchange with hot water flowing through a group of pipes of the condenser, and the hot water is supplied from the group of condenser pipes (see, for example, Japanese Patent Unexamined Publication Nos. 57-73367 and 57-136066).

However, the above method (a) has a drawback that the cooling medium steam from the high-temperature regenerator is deprived of the heat by the cooling medium liquid in the U-shaped seal pipe, thus causing a large heat loss.

The above method (b) suffers from a drawback that the additional heat exchanger is required, thus increasing the cost and an installation space.

Although the above method (c) can achieve a simple construction of the absorbing-type water cooling-heating apparatus, it is necessary to switch a pipe connection of the load between a group of evaporator pipes and the group of condenser pipes, depending on the heating operation and the cooling operation, which leads to a drawback that the operation of switching between the cooling mode and the heating mode is complicated.

SUMMARY OF INVENTION

It is an object of the invention to provide an absorbing type water cooling-heating apparatus in which the operation can be automatically switched between a cooling mode and a heating mode and electric power consumption can be saved.

According to the invention, the above object is attainable by an absorbing type water cooling-heating apparatus which comprises an evaporator for evaporating a cooling medium to cool cooling water, an absorber for causing a solution to absorb steam of the cooling medium, which is evaporated in the evaporator, to dilute the solution, a high-temperature regenerator and a low-temperature regenerator for concentrating the dilute solution, which is fed thereto from the absorber, by forming steam of the cooling medium, a condenser for condensing the steam of the cooling medium, which is produced in the low-temperature regenerator, into a liquid, a solution circulating pump for circulating the solution, a cooling medium spray pump for spraying the cooling medium, a cooling medium steam pipe connecting the interior of the high-temperature regenerator, in which the cooling medium steam is contained, to the interior of the evaporator in which the cooling medium is sprayed, a throttle device mounted on the cooling medium steam pipe, an electrically-operated valve mounted on the cooling medium steam pipe, and a cooling-heating change-over switch connected to the electrically-operated valve for switching the operation of the electrically-operated valve when the operation of the apparatus is switched between a cooling mode and a heating mode.

Preferably, the cooling medium steam pipe between the electrically-operated valve and the throttle device is connected through a solution diluting pipe to the interior of the absorber in which the solution is sprayed, an ejector is provided in the solution diluting pipe at a level generally corresponding to a cooling medium liquid reservoir portion within the evaporator, and a cooling medium suction pipe is connected to an suction side of the ejector, which is in communication with the cooling medium liquid reservoir portion.

In the cooling operation, the electrically-operated valve is closed by the cooling-heating change-over switch, and the cooling medium steam produced in the high-temperature regenerator is converted into a cooling medium liquid through the low-temperature regenerator and the condenser and is used for cooling water flowing through the pipe within the evaporator. In the heating operation, the electrically-operated valve is opened by the cooling-heating change-over switch, and the cooling medium steam produced in the high-temperature regenerator by-passes the low-temperature regenerator and the condenser through the cooling medium steam pipe and is used for directly heating the water in the pipe within the evaporator. Further, the cooling medium spray pump is not operated, and part of the cooling medium steam produced in the high-temperature regenerator is fed into the solution diluting pipe, so that an appropriate pressure differential is produced through the throttle device, and by an ejection effect, the cooling medium is fed from a cooling medium liquid reservoir portion to an upper portion of the absorber to dilute the solution in the absorber. By doing so, switching between the cooling mode and the heating mode can be automatically effected. Thus, it is not necessary to operate the cooling medium spray pump when diluting the solution, and therefore electric power consumption can be saved.

DESCRIPTION OF PREFERRED EMBODIMENTS

Figure 1:
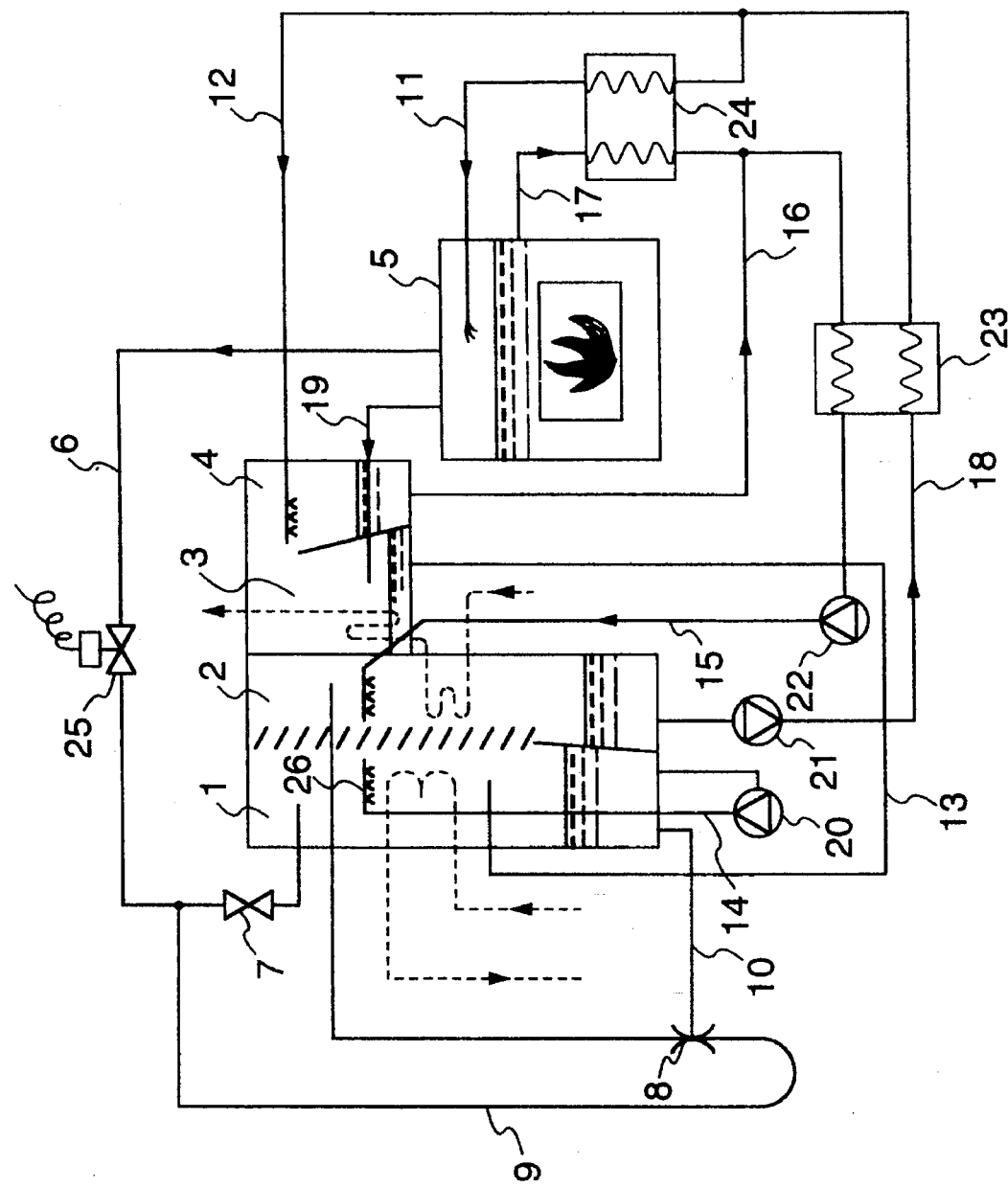
FIG. 1 is a system diagram of an absorbing-type water cooling-heating apparatus according to an embodiment of the present invention.

Description will be made on an embodiment of the invention with reference to FIG. 1.

An absorbing-type water cooling-heating apparatus of this embodiment comprises an evaporator 1, an absorber 2, a condenser 3, a low-temperature regenerator 4, a high-temperature regenerator 5, a cooling medium steam pipe 6, a throttle device 7, an ejector 8, a solution-diluting pipe 9, a cooling medium suction pipe 10, a high-temperature regenerator feed pipe 11, a low-temperature regenerator feed pipe 12, a cooling medium return pipe 13, a cooling medium spray pipe 14, a solution spray pipe 15, a low-temperature regenerator return pipe 16, a high-temperature regenerator return pipe 17, a solution feed pipe 18, another cooling medium steam pipe 19, a cooling medium spray pump 20, a solution circulating pump 21, a solution spray pump 22, a low-temperature heat exchanger 23, a high-temperature heat exchanger 24, an electrically-operated valve 25, and a cooling medium spray header 26.

When a cooling-heating change-over switch on a control panel of the absorbing-type water cooling-heating apparatus is turned to a cooling mode so as to effect a cooling operation, the electrically-operated valve 25 is closed in response to this operation of the change-over switch. A cooling medium is caused by the cooling medium spray pump 20 to flow down along an outer surface of a pipe within the evaporator 1 to absorb latent heat of evaporation from water flowing through the interior of this pipe, thereby cooling the water. This water is used as cooling water for effecting the cooling operation. The cooling medium having absorbed the heat evaporates and flows as cooling medium steam into the absorber 2. In the absorber 2, the cooling medium steam is absorbed by a Concentrated solution which is sprayed from an upper portion of the inside of the absorber 2 by the solution spray pump 22, and heat of absorption produced at this time is absorbed by cooling water flowing through the interior of a pipe within the absorber 2. The dilute solution, which has lowered in concentration as a result of absorbing the cooling medium steam, is caused by the solution circulating pump 21 to flow through the solution feed pipe 18, and further flows through the low-temperature heat exchanger 23 and the high-temperature heat exchanger 24, and is fed to the high-temperature regenerator 5 through the feed pipe 11. A concentrated solution is returned through the high-temperature heat exchanger 24 and the low-temperature heat exchanger 23, and joins the concentrated solution which returns from the low-temperature generator 4 through the pipe 16. In the high-temperature regenerator 5, the dilute solution is heated by a heating source, such as gas, oil and steam, into a concentrated solution. Hot steam of the cooling medium produced at this time is fed into the low-temperature regenerator 4 via the cooling medium steam pipe 19, and is used in a pipe within the low-temperature regenerator 4 for heating the dilute solution. Steam of the cooling medium produced within the low-temperature regenerator 4, as well as steam of the cooling medium used as a heating source in the pipe within the low-temperature regenerator 4 for heating the solution, is fed to the condenser 3, and is deprived of the heat by cooling water in a pipe within the condenser 3, so that these steams condense. The cooling medium liquid resulting from the condensation is returned to the evaporator 1 via the cooling medium return pipe 13. The thus returned cooling medium liquid is stored in a cooling medium liquid reservoir portion within the evaporator 1, is fed through the cooling medium spray pipe 14 by the cooling medium spray pump 20, and is again sprayed onto the outer surface of the pipe within the evaporator 1 from the cooling medium spray header 26.

When the cooling-heating change-over switch on the control panel of the absorbing-type water cooling-heating apparatus is turned to a heating mode so as to effect a heating operation, the electrically-operated valve 25 is opened in response to this operation of the change-over switch. The dilute solution is supplied into the high-temperature regenerator 5, and is heated by the heating source such as gas, oil and steam, into a concentrated solution. Hot steam of the cooling medium produced at this time flows through the cooling medium steam pipe 6 since the electrically-operated valve 25 is open. At this time, the cooling medium steam tends to flow via the cooling medium steam pipe 19 into the pipe within the low-temperature regenerator 4. However, since the cooling water does not flow through the pipe within the absorber 2 and through the pipe within the condenser 3 during the heating operation, the steam is not condensed within the condenser 3, and besides since the inner diameter of the cooling medium return pipe 13 is small, a large pressure loss develops when the steam passes through this pipe. For these reasons, the cooling medium steam hardly flows into the pipe within the low-temperature regenerator 4. Hot steam of the cooling medium, flowing through the cooling medium steam pipe 6, passes through the throttle device 7, and heats the outer surface of the pipe within the evaporator 1 to make water, flowing through this pipe, hot. This hot water is used for effecting the heating operation. The cooling medium steam, deprived of the heat as a result of heating the water within the evaporator 1, condenses, and is stored in the cooling medium liquid reservoir portion within the evaporator 1. Since a cycle of the heating operation is constituted only by the production of the hot cooling medium steam at the high-temperature regenerator 5 and the heating of the water within the evaporator 1, it is necessary to dilute the solution. Part of the cooling medium steam flowing through the cooling medium steam pipe 6 is taken out in a branched-off manner from an intermediate portion of the cooling medium steam pipe 6 between the throttle valve and the electrically-operated valve and is fed to the solution-diluting pipe 9 which leads to the upper portion of the absorber 2. At this time, an appropriate pressure differential is produced by the throttle device 7 mounted on the cooling medium steam pipe 6, so that when the cooling medium steam passes through the ejector 8 mounted on the solution-diluting pipe 9, the cooling medium liquid, stored in the cooling medium liquid reservoir portion within the evaporator 1, is drawn into the cooling medium suction pipe 10 because of an ejection effect, and is fed up to the upper portion of the absorber 2 via the solution-diluting pipe 9, and then is blown into the absorber 2. By doing so, the solution is diluted during the heating operation.

Figure 2:
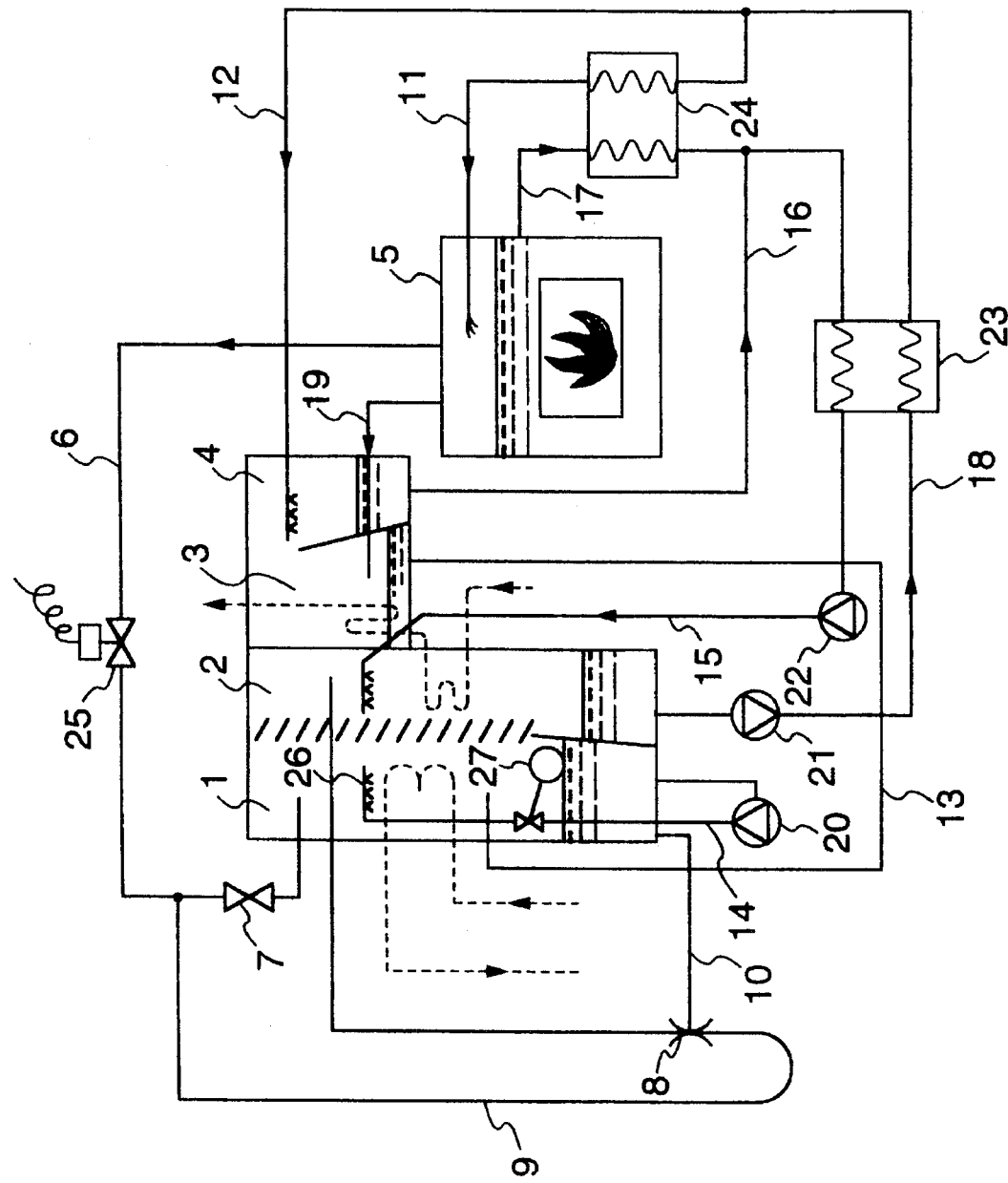
FIG. 2 is a system diagram of an absorbing-type water cooling-heating apparatus according to another embodiment of the invention.

Another embodiment of the invention will now be described with reference to FIG. 2.

This embodiment differs from the preceding embodiment in that a cooling medium liquid surface float valve 27 is provided in the cooling medium spray pipe 14 which is connected to the delivery side of the cooling medium spray pump 20. The float valve 27 is opened and closed in accordance with a liquid surface or level in the cooling medium liquid reservoir portion.

When the cooling-heating change-over switch on the control panel of the absorbing-type water cooling-heating apparatus is turned to the cooling mode so as to effect a cooling operation, the electrically-operated valve 25 is closed in response to this operation of the change-over switch. A cooling medium is caused by the cooling medium spray pump 20 to flow down along the outer surface of the pipe within the evaporator 1 to absorb latent heat of evaporation from water flowing through the interior of this pipe, thereby cooling the water. This water is used as cooling water for effecting the cooling operation. The cooling medium having absorbed the heat evaporates, and flows as cooling medium steam into the absorber 2. In the absorber 2, the cooling medium steam is absorbed by a concentrated solution sprayed from an upper portion of the inside of the absorber 2 by the solution spray pump 22, and heat of absorption produced at this time is absorbed by cooling water flowing through the interior of the pipe within the absorber 2. The dilute solution, which has lowered in concentration as a result of absorbing the cooling medium steam, is caused by the solution circulating pump 21 to flow through the solution feed pipe 18, and further flows through the low-temperature heat exchanger 23 and the high-temperature heat exchanger 24, and is fed to the high-temperature regenerator 5 through the feed pipe 11. A concentrated solution is returned through the high-temperature heat exchanger 24 and the low-temperature heat exchanger 23, and joins the concentrated solution which returns from the low-temperature generator 4 through the pipe 16. In the high-temperature regenerator 5, the dilute solution is heated by the heating source, such as gas, oil and steam, into a concentrated solution. Hot steam of the cooling medium produced at this time is fed into the low-temperature regenerator 4 via the cooling medium steam pipe 19, and is used in the pipe within the low-temperature regenerator 4 for heating the dilute solution. Steam of the cooling medium produced within the low-temperature regenerator 4, as well as steam of the cooling medium used as a heating source in the pipe within the low-temperature regenerator 4 for heating the solution, is fed to the condenser 3, and is deprived of the heat by cooling water in a pipe within the condenser 3, so that these steams condense. The cooling medium liquid resulting from the condensation is returned to the evaporator 1 via the cooling medium return pipe 13. The thus returned cooling medium liquid is stored in the cooling medium liquid reservoir portion provided within the evaporator 1 at its lower portion, is fed through the cooling medium spray pipe 14 by the cooling medium spray pump 20, and is again sprayed onto the outer surface of the pipe within the evaporator 1 from the cooling medium spray header 26.

The cooling medium liquid surface float valve 27 is provided in the cooling medium spray pipe 14 to be opened and closed in accordance with a change in liquid level of the cooling medium within the cooling medium liquid reservoir portion. With this construction, even when the liquid level of the cooling medium drops, the cooling medium liquid surface float valve 27 is closed, so that the cooling medium is prevented from being sprayed onto the outer surface of the pipe within the evaporator 1, thereby preventing cavitation from developing in the cooling medium spray pump 20.

The operation for the heating mode is the same as that described in the preceding embodiment, and description thereof is omitted here.

Figure 3:
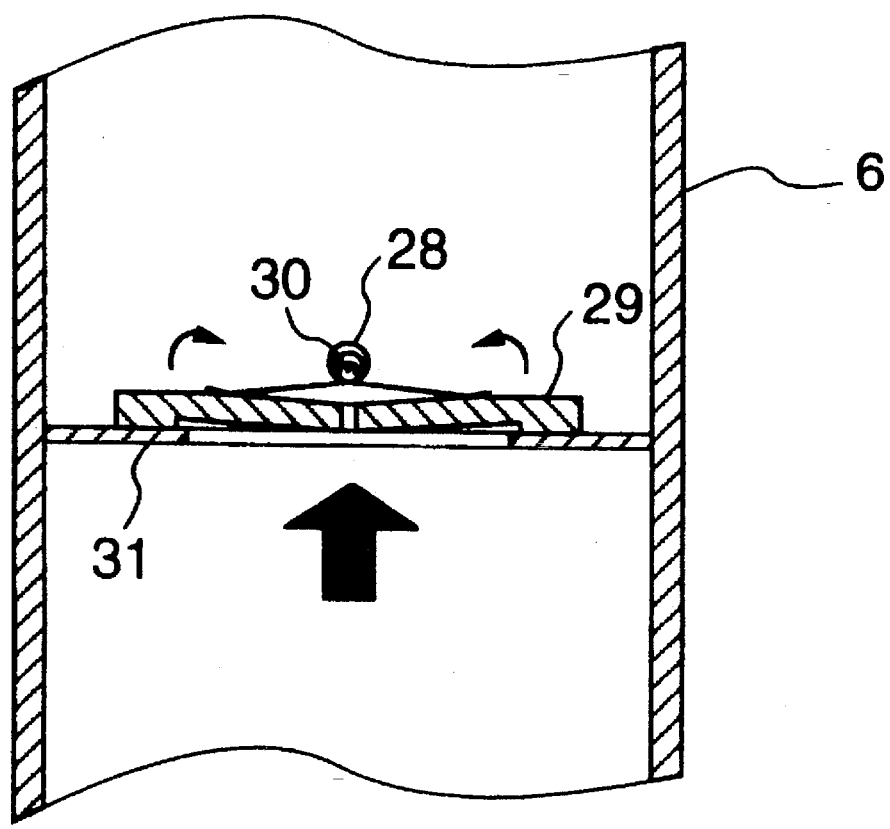
FIG. 3 is a detailed view of a throttle valve used in the absorbing-type water cooling-heating apparatus of the invention.

FIG. 3 shows details of the throttle device 7.

The throttle device 7 is mounted in the cooling medium steam pipe 6 and comprises a spring 28, a pair of plates 29, a hinge pin 30, and a seat 31. Depending on the pressure of a cooling medium flowing through the cooling medium steam pipe 6, the pair of plates 29 of a semi-circular shape are closed under the influence of the spring 28, thereby providing an appropriate pressure differential.

Still another embodiment of the invention using the throttle device of the above construction will now be described. This embodiment is identical in construction to the embodiment of FIG. 1 except for the throttle device.

When the cooling-heating change-over switch on the control panel of the absorbing-type water cooling-heating apparatus is turned to the cooling mode so as to effect a cooling operation, the electrically-operated valve 25 is closed in response to this operation of the change-over switch. A cooling medium is caused by the cooling medium spray pump 20 to flow down along the outer surface of the pipe within the evaporator 1 to absorb latent heat of evaporation from water flowing through the interior of this pipe, thereby cooling the water. This water is used as cooling water for effecting the cooling operation. The cooling medium having absorbed the heat evaporates and flows as cooling medium steam into the absorber 2. In the absorber 2, the cooling medium steam is absorbed by a concentrated solution which is sprayed from the upper portion of the inside of the absorber 2 by the solution spray pump 22, and heat of absorption produced at this time is absorbed by cooling water flowing through the interior of a pipe within the absorber 2. The dilute solution, which has lowered in concentration as a result of absorbing the cooling medium steam, is caused by the solution circulating pump 21 to flow through the solution feed pipe 18, and further flows through the low-temperature heat exchanger 23 and the high-temperature heat exchanger 24, and is fed to the high-temperature regenerator 5 through the feed pipe 11. A concentrated solution is returned through the high-temperature heat exchanger 24 and the low-temperature heat exchanger 23, and joins the concentrated solution which returns from the low-temperature generator 4 through the pipe 16. In the high-temperature regenerator 5, the dilute solution is heated by the heating source, such as gas, oil and steam, into a concentrated solution. Hot steam of the cooling medium produced at this time is fed into the low-temperature regenerator 4 via the cooling medium steam pipe 19, and is used in the pipe within the low-temperature regenerator 4 for heating the dilute solution. Steam of the cooling medium produced within the low-temperature regenerator 4, as well as steam of the cooling medium used as a heating source in the pipe within the low-temperature regenerator 4 for heating the solution, is fed to the condenser 3, and is deprived of the heat by cooling water in the pipe within the condenser 3, so that these steams condense. The cooling medium liquid resulting from the condensation is returned to the evaporator 1 via the cooling medium return pipe 13. The thus returned cooling medium liquid is stored in the cooling medium liquid reservoir portion within the evaporator 1, is fed through the cooling medium spray pipe 14 by the cooling medium spray pump 20, and is again sprayed onto the outer surface of the pipe within the evaporator 1 from the cooling medium spray header 26.

When the cooling-heating change-over switch on the control panel of the absorbing-type water cooling-heating apparatus is turned to the heating mode so as to effect a heating operation, the electrically-operated valve 25 is opened in response to this operation of the change-over switch. The dilute solution is supplied into the high-temperature regenerator 5, and is heated by the heating source such as gas, oil and steam, into a concentrated solution. Hot steam of the cooling medium produced at this time flows through the cooling medium steam pipe 6 since the electrically-operated valve 25 is open. At this time, the cooling medium steam tends to flow via the cooling medium steam pipe 19 into the pipe within the low-temperature regenerator 4. However, since the cooling water does not flow through the pipe within the absorber 2 and through the pipe within the condenser 3 during the heating operation, the steam is not condensed within the condenser 3, and besides since the inner diameter of the cooling medium return pipe 13 is small, a large pressure loss develops when the steam passes through this pipe. For these reasons, the cooling medium steam hardly flows into the pipe within the low-temperature regenerator 4. Hot steam of the cooling medium, flowing through the cooling medium steam pipe 6, passes through the throttle device 7, and heats the outer surface of the pipe within the evaporator 1 to make water, flowing through this pipe, hot. This hot water is used for effecting the heating operation. The cooling medium steam, deprived of the heat as a result of heating the water within the evaporator 1, condenses, and is stored in the cooling medium liquid reservoir portion within the evaporator 1. Since a cycle of the heating operation is constituted only by the production of the hot cooling medium steam at the high-temperature regenerator 5 and the heating of the water within the evaporator 1, it is necessary to dilute the solution. Part of the cooling medium steam flowing through the cooling medium steam pipe 6 is taken out in a branched-off manner from the intermediate portion of the cooling medium steam pipe 6 between the throttle valve and the electrically-operated valve and is fed to the solution-diluting pipe 9 which is connected to the upper portion of the absorber 2. At this time, an appropriate pressure differential is produced by the throttle device 7 mounted on the cooling medium steam pipe 6, so that when the cooling medium steam passes through the ejector 8 mounted on the solution-diluting pipe 9, the cooling medium liquid, stored in the cooling medium liquid reservoir portion within the evaporator 1, is drawn into the cooling medium suction pipe 10 because of an ejection effect, and is fed up to the upper portion of the absorber 2 via the solution-diluting pipe 9, and then is blown into the absorber 2. By doing so, the solution is diluted during the heating operation. In this embodiment, the throttle valve 7 is of the construction that will not open unless the pressure differential is above a predetermined level, and also the degree of opening of the throttle device 7 varies in accordance with variations in heating load. Therefore, the cooling medium liquid can be blown into the absorber 2 in accordance with the heating load.

Thanks to the provision of the electrically-operated valve, the switching between the cooling operation and the heating operation can be automatically carried out only by the cooling-heating change-over switch.

When the solution is to be diluted, it is not necessary to open and close the valve, and also it is not necessary to operate the cooling medium pump.

Cavitation in the cooling medium spray pump due to the drop of the cooling medium surface or level is prevented.

What is claimed is:

1. An absorbing type water cooling-heating apparatus comprising:

an evaporator for evaporating a cooling medium so as to cool cooling water;

an absorber for causing a solution to absorb steam of the cooling medium evaporated in said evaporator, so as to dilute the solution;

a high-temperature regenerator and a low-temperature regenerator for concentrating dilute solution, fed thereto from said absorber, by forming steam of the cooling medium;

a condenser for condensing the steam of the cooling medium, produced in said low-temperature regenerator, into a liquid;

a solution circulating pump for circulating the solution;

a cooling medium spray pump for spraying the cooling medium;

a cooling medium steam pipe connecting an interior of said high-temperature regenerator, in which the cooling medium steam is contained, to an interior of said evaporator in which the cooling medium is sprayed;

a throttle device provided in said cooling medium steam pipe;

an electrically-operated valve provided in said cooling medium steam pipe;

a cooling-heating change-over switch connected to said electrically-operated valve for switching said electrically-operated valve when changing operation of the apparatus between a cooling mode and a heating mode; and a solution diluting pipe connecting a portion of said cooling medium steam pipe intermediate between said electrically-operated valve and said throttle device to an interior of said absorber in which the solution is sprayed, an ejector provided in said solution diluting pipe at a level substantially corresponding to a cooling medium liquid reservoir portion within said evaporator, and a cooling medium suction pipe connected between an suction side of said ejector and said cooling medium liquid reservoir portion.

2. An apparatus according to claim 1, further comprising a cooling medium liquid surface float valve provided in a cooling medium spray pipe connected to a delivery side of said cooling medium spray pump, said float valve being opened and closed in accordance with a level of the cooling medium liquid in said cooling medium liquid reservoir portion.

3. An apparatus according to claim 1, wherein said throttle device has a construction opened and closed by predetermined pressure differentials.

\* \* \* \* \*